US012535079B1

(12) United States Patent
Li

(10) Patent No.: US 12,535,079 B1
(45) Date of Patent: Jan. 27, 2026

(54) CIRCULATION FAN

(71) Applicant: Hunan Chaoyu Technology Co., Ltd., Chenzhou (CN)

(72) Inventor: Kanjian Li, Chenzhou (CN)

(73) Assignee: Hunan Chaoyu Technology Co., Ltd., Chenzhou (CN)

( * ) Notice: Subject to any disclaimer, the term of this patent is extended or adjusted under 35 U.S.C. 154(b) by 0 days.

(21) Appl. No.: 19/021,663

(22) Filed: Jan. 15, 2025

(30) Foreign Application Priority Data

Nov. 22, 2024 (CN) ......................... 202422865892.3

(51) Int. Cl.

| | |
|---|---|
| ***F04D 25/08*** | (2006.01) |
| ***F04D 29/52*** | (2006.01) |
| ***F21V 33/00*** | (2006.01) |
| *H04R 1/02* | (2006.01) |

(52) U.S. Cl.
CPC ........... *F04D 25/08* (2013.01); *F04D 25/084* (2013.01); *F04D 29/522* (2013.01); *F21V 33/0096* (2013.01); *H04R 1/028* (2013.01)

(58) Field of Classification Search
CPC ...... F04D 25/08; F04D 25/084; F04D 29/522; F21V 33/0096; H04R 1/028
See application file for complete search history.

(56) References Cited

U.S. PATENT DOCUMENTS

| | | | | |
|---|---|---|---|---|
| 7,717,292 | B2 * | 5/2010 | Faust, III | A61B 50/30 16/421 |
| 2022/0080437 | A1 * | 3/2022 | Zhong | F04D 25/0673 |
| 2024/0209864 | A1 | 6/2024 | Guo et al. | |

FOREIGN PATENT DOCUMENTS

| | | | | | |
|---|---|---|---|---|---|
| CN | 208474183 | U | | 2/2019 | |
| CN | 112943658 | A | * | 6/2021 | F04D 29/646 |
| CN | 113202796 | A | | 8/2021 | |
| CN | 113446248 | A | | 9/2021 | |
| CN | 114542494 | A | * | 5/2022 | F04D 25/08 |
| CN | 217029374 | U | | 7/2022 | |
| CN | 217814038 | U | * | 11/2022 | F04D 29/70 |
| CN | 218062720 | U | | 12/2022 | |
| CN | 218844645 | U | | 4/2023 | |
| CN | 219220778 | U | | 6/2023 | |
| CN | 219282039 | U | | 6/2023 | |
| CN | 119572509 | A | * | 3/2025 | F04D 27/002 |

OTHER PUBLICATIONS

First Office Action for MX Application No. MX/u/2025/000049 and English translation, mailed Jun. 12, 2025 (10 pages).
Search Report for EP Application No. EP 25 15 1491 and English translation, mailed Jul. 1, 2025 (9 pages).

* cited by examiner

*Primary Examiner* — Nathaniel E Wiehe
*Assistant Examiner* — Theodore C Ribadeneyra
(74) *Attorney, Agent, or Firm* — Leason Ellis LLP

(57) ABSTRACT

A circulation fan is disclosed, including a base, a blowing assembly and a connecting assembly, where the blowing assembly includes blades, a shield, a storage bin, and a motor for driving the blades to rotate; the connecting assembly includes a first bracket and a second bracket, a gear is provided between the first bracket and the shield, and a side face of the shield is provided with a thread cooperating with the gear; one end of the shield near the second bracket is provided with a lead slot, and a baffle is provided on outer side of the lead slot; the shield is movably connected to the base by the first bracket and the second bracket.

9 Claims, 4 Drawing Sheets

CIRCULATION FAN

CROSS-REFERENCE TO RELATED APPLICATION

This application is based on and claims the benefit of priority from Chinese Patent Application 202422865892.3 filed Nov. 22, 2024, the entirety of which is incorporated by reference herein.

TECHNICAL FIELD

The present disclosure relates to the field of electric fans, and in particular to a circulation fan.

BACKGROUND

With the development of the times and increasing popularity of consumer products, there are new demands for traditional fans, such as wind speed, availability during power failure, portability, multi-use and the like. There are a variety of desktop fans, small desk fans with a temperature control function, small fans with mosquito-repellent incense boxes and the like. The portable circulation fan can follow the change of people's needs, and have multi-functions meeting different demand scenarios. The portable circulation fan has portability and availability during power failure, which further expand the application scenario of products. However, the existing circulation fans have single function and large application scenario limit, some circulation fans cannot flexibly adjust and fix an air-out angle of the fan, which greatly affects the use convenience and user experience of circulation fans.

SUMMARY

In order to solve the above-mentioned problems, an object of the present disclosure is to provide a circulation fan, so that the blowing assembly can flexibly adjust the angle according to requirements, and improve the convenience of use and user experience of the circulation fan.

In an embodiment of the present disclosure, a circulation fan is provided, including a base, a blowing assembly and a connecting assembly, where the blowing assembly includes blades, a shield, a storage bin, and a motor for driving the blades to rotate, and the storage bin is detachably fixed on outer side of the shield; the connecting assembly includes a first bracket and a second bracket, a gear with first teeth is provided between the first bracket and the shield, and a side face of the shield is provided with second teeth cooperating with the first teeth on the gear; one end of the shield near the second bracket is provided with a lead slot, and a baffle is provided on outer side of the lead slot; and the shield is movably connected to the base by the first bracket and the second bracket.

The above circulation fan has at least the following advantageous effects: by providing a blowing assembly and a connecting assembly, the blowing assembly can be flexibly provided on the base to ensure structural stability of the circulation fan; by providing a first bracket and a second bracket, it is convenient to adjust an angle of the blades and also to facilitate a wire of a motor leading to the base, so as to improve the convenience of using the circulation fan; by providing a gear with the first teeth and second teeth, an angle between the shield and the stationary base can be precisely adjusted to improve the ease of use and user experience of the circulation fan.

Further, a key, a temperature sensor and a display are provided on the base, and the motor is electrically connected to the key, the temperature sensor and the display via a lead slot. By providing the key, the temperature sensor and the display, it is ensured that the motor can control the opening degree (i.e., the rotation speed) according to the temperature sensor and the key, and visually show the working state of the circulation fan through the display, so as to improve the convenience of using the circulation fan.

Further, an upper end of the second bracket is provided with a lead hole cooperating with the lead slot, and the shield is movably connected to the second bracket by inserting one end of the lead slot into the lead hole. By providing the lead hole, the convenience of the leading wire between the motor and the key and the temperature sensor is ensured, and the winding of the cable during the rotation of the blowing assembly is avoided, thus affecting the structural stability of the circulation fan.

Further, a speaker is further provided in the second bracket, a radio device is provided on the base, and the speaker and the radio device are both electrically connected to the key. By providing the speaker and the radio device, the circulation fan can acquire a voice control instruction sent by a user via the radio device, and the motor adjusts a rotation speed according to the voice control instruction; and the speaker provides a voice message reflecting the current operating state to a user, so as to improve the convenience of using the circulation fan.

Further, an illuminating lamp is further connected to the key, and a lampshade is provided on the shield to cooperate with the illuminating lamp. By providing the illuminating lamp and the lampshade, it is convenient for the circulation fan to emit illuminating light through the illuminating lamp to improve the convenience of using the circulation fan.

Further, an upper end of the first bracket is provided with a positioning block, the gear is fixed to the first bracket by the positioning block; the upper end of the first bracket is inserted into the shield through the gear with the first teeth engaging with the second teeth. By providing the positioning block, the gear can be quickly and stably fixed in the first bracket, the first teeth on the gear can be stably engaged with the second teeth, and the positioning accuracy of the blowing assembly can be improved.

Further, an end of the first bracket away from the shield and an end of the second bracket away from the shield are provided with a cover plate respectively. By providing a cover plate, the stability of the connection between the first bracket and the second bracket and the shield is ensured, the looseness of the shield during operation is avoided, and the structural stability and service life of the circulation fan are improved.

Further, a lower end of the base is further provided with a hook and a snap-fit slot cooperating with the hook, and the hook is hinged to the base. By providing the hook and the snap-fit slot, the base can be hung upside down via the hook, and the hook can be completely received in the snap-fit slot, so as to improve the structural integrity and the convenience of use of the circulation fan.

Further, the upper end of the shield is provided with a handle. By providing the handle, it is convenient to adjust the angle of the shield, and also convenient to transfer the circulation fan by the handle, so as to improve the convenience of using the circulation fan.

Further, the shield is provided with a positioning groove, and the storage bin is provided with a mounting block cooperating with the positioning groove and a through hole for air permeation. By providing the positioning slot and the mounting block, it is convenient to place mosquito coils, aromas and the like in the storage bin, so as to improve the compatibility and convenience of the circulation fan.

The above circulation fan has the following advantageous effects: by providing the blowing assembly and the connecting assembly, the blowing assembly can be flexibly provided on the base to ensure structural stability of the circulation fan; by providing the first bracket and the second bracket, it is convenient to adjust an angle of the blades and also to facilitate the wire of the motor leading to the base, so as to improve the convenience of using the circulation fan; by providing a gear with the first teeth and the second teeth, an angle between the shield and the stationary base can be precisely adjusted to improve the ease of use and user experience of the circulation fan. By providing the key, the temperature sensor and the display, it is ensured that the motor can control the opening degree (i.e., the rotation speed) according to the temperature sensor and the key, and visually displaying the working state of the circulation fan via the display, so as to improve the convenience of using the circulation fan. By providing the lead hole, the convenience of the leading wire between the motor and the key and the temperature sensor is ensured, and the winding of the cable during the rotation of the blowing assembly is avoided, thus affecting the structural stability of the circulation fan. By providing the positioning block, the gear can be quickly and stably fixed in the first bracket, the first teeth on the gear can be stably engaged with the second teeth, and the positioning accuracy of the blowing assembly can be improved.

Additional aspects and advantages of the disclosure will be set forth in part in the description which follows and, in part, will be obvious from the description, or may be learned by practice of the disclosure.

BRIEF DESCRIPTION OF THE DRAWINGS

The above and/or additional aspects and advantages of the disclosure will become apparent and readily understood from the following description of embodiments taken in conjunction with the accompanying drawings of which.

DETAILED DESCRIPTION

Figure 1:
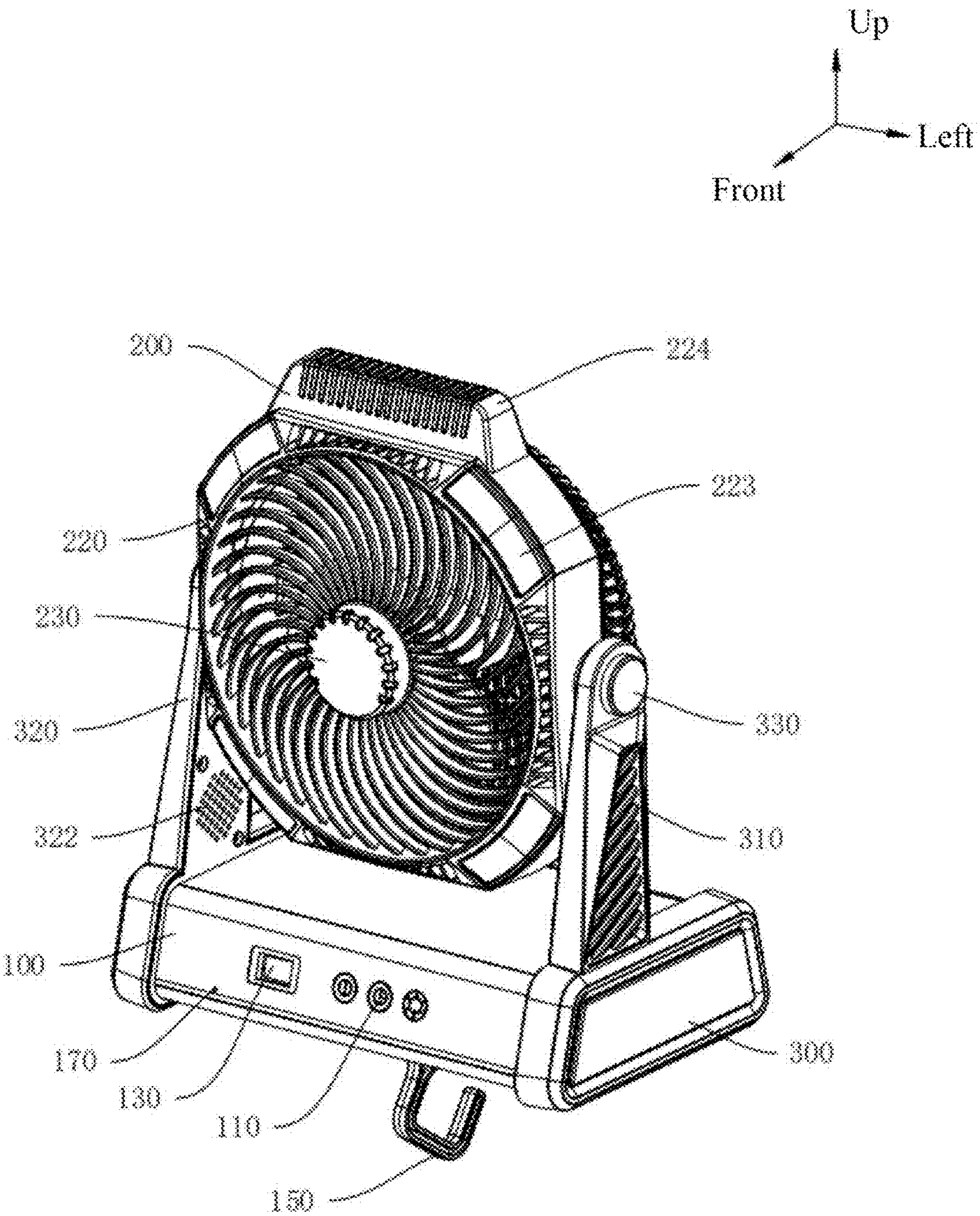
FIG. 1 is a schematic structural diagram of a circulation fan according to an embodiment of the present disclosure.

Embodiments of the present disclosure are described in detail below, examples of which are illustrated in the accompanying drawings, wherein like reference numerals refer to the same or similar elements throughout the several views, and wherein like reference numerals refer to the same or similar elements throughout the several views. The embodiments described below with reference to the figures are exemplary only to explain the present disclosure and should not be construed as limiting the present disclosure.

Figure 2:
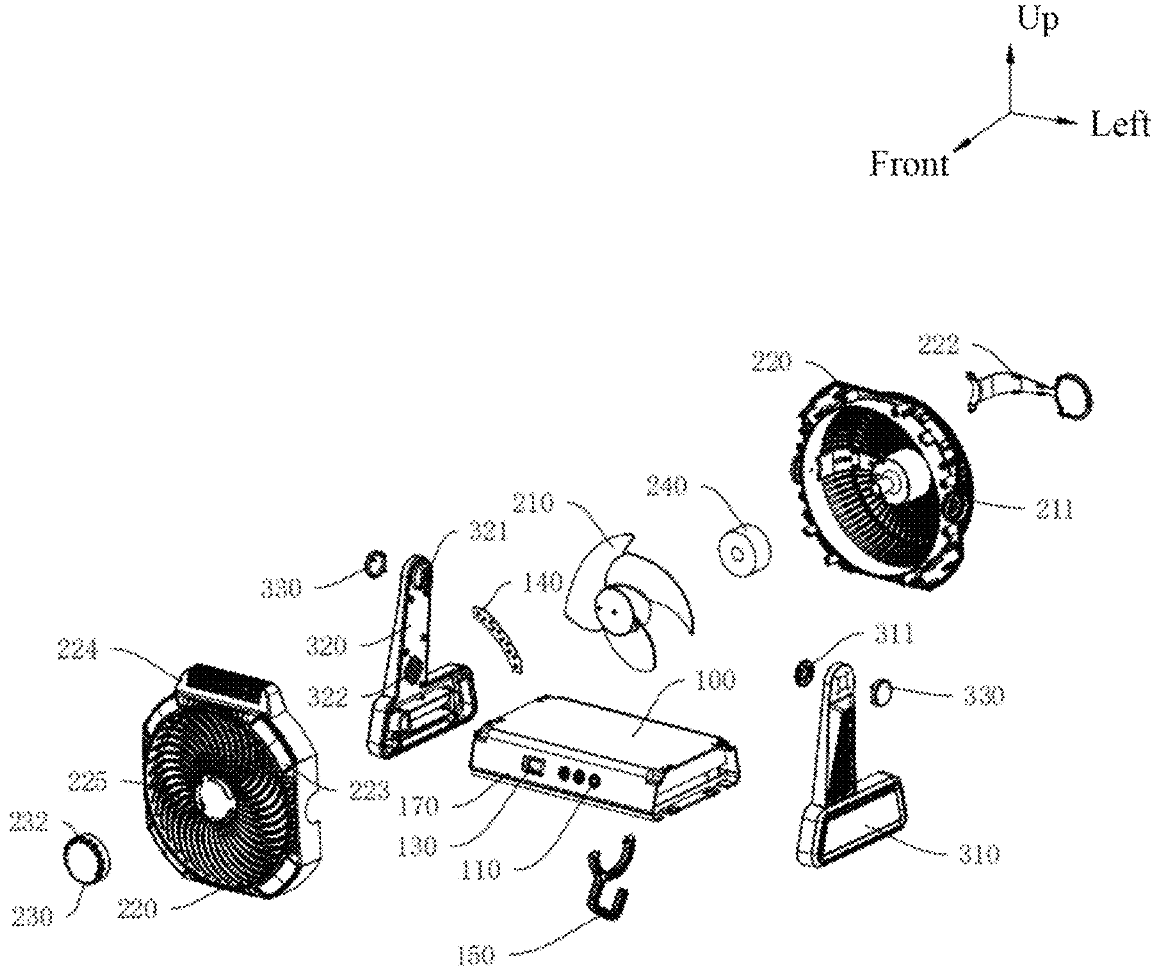
FIG. 2 is a structural exploded view of a circulation fan according to an embodiment of the present disclosure.
Figure 3:
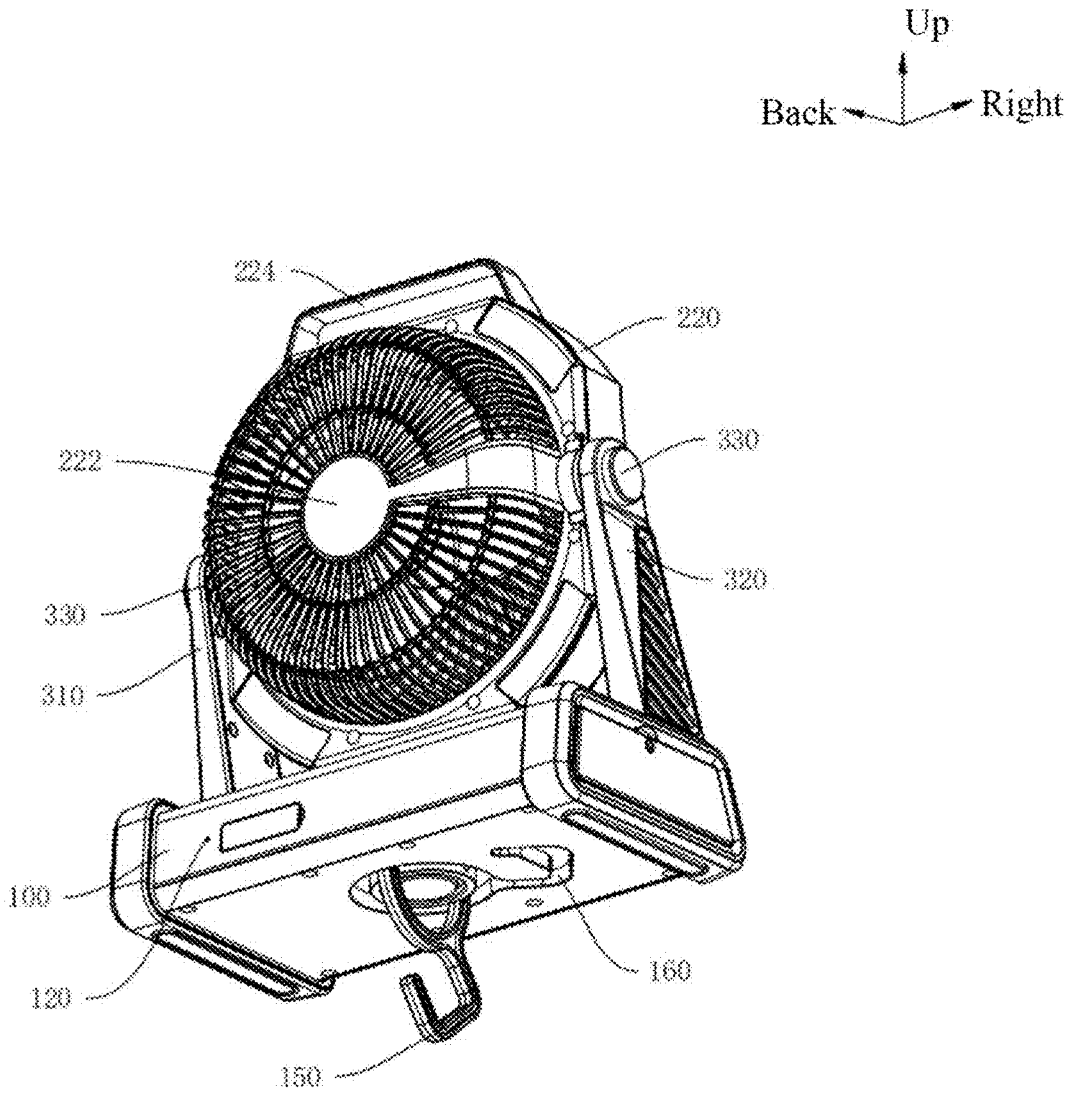
FIG. 3 is a schematic structural diagram of a circulation fan at another angle according to an embodiment of the present disclosure.
Figure 4:
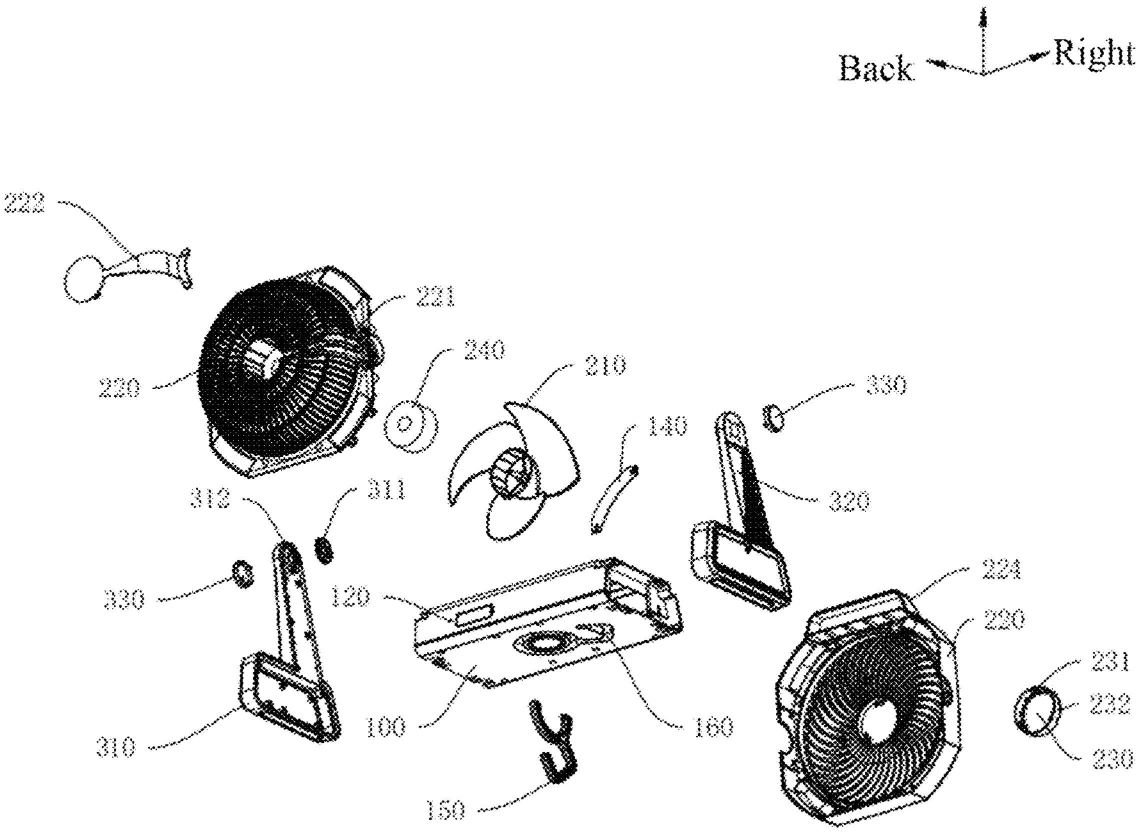
FIG. 4 is a structural exploded view of a circulation fan at another angle according to an embodiment of the present disclosure.

With reference to FIGS. 1 to 4, an embodiment of the present disclosure provides a circulation fan, including a base 100, a blowing assembly 200, and a connecting assembly 300, where the blowing assembly 200 includes blades 210, a shield 220, a storage bin 230, and a motor 240 for driving the blades 210 to rotate, and the storage bin 230 is detachably fixed on outer side of the shield 220; the connecting assembly 300 includes a first bracket 310 and a second bracket 320, a gear 311 with first teeth is provided between the first bracket 310 and the shield 220, and a side face of the shield 220 is provided with second teeth 211 cooperating with the first teeth on the gear 311; one end of the shield 220 near the second bracket 320 is provided with a lead slot 221, and a baffle 222 is provided on outer side of the lead slot 221; and the shield 220 is movably connected to the base 100 by the first bracket 310 and the second bracket 320.

By providing the blowing assembly 200 and the connecting assembly 300, the blowing assembly 200 can be flexibly provided on the base 100 to ensure the structural stability of the circulation fan; by providing the first bracket 310 and the second bracket 320, it is convenient to adjust an angle of the blades 210 and also to facilitate a wire of a motor 240 leading to the base 100, so as to improve the convenience of using the circulation fan; by providing a gear 311 with first teeth and second teeth 211, an angle between the shield 220 and the stationary base 100 can be precisely adjusted to improve the ease of use and user experience of the circulation fan.

In another embodiment, a key 110, a temperature sensor 120, and a display 130 are provided on the base 100, and the motor 240 is electrically connected to the key 110, the temperature sensor 120 and the display 130 via a lead slot 221. By providing the key 110, the temperature sensor 120, and the display 130, it is ensured that the motor 240 can control the opening degree (i.e., the rotation speed) according to the temperature sensor 120 and the key 110, and visually show the working state of the circulation fan through the display 130, so as to improve the convenience of using the circulation fan.

In another embodiment, an upper end of the second bracket 320 is provided with a lead hole 321 cooperating with the lead slot 221, and the shield 220 is movably connected to the second bracket 320 by inserting one end of the lead slot 221 into the lead hole 321. By providing the lead hole 321, the convenience of the leading wire between the motor 240 and the key 110 and the temperature sensor 120 is ensured, and the winding of the cable during the rotation of the blowing assembly 200 is avoided, thus affecting the structural stability of the circulation fan.

In another embodiment, a speaker 322 is further provided in the second bracket 320, a radio device 170 is provided on the base 100, and both the speaker 322 and the radio device 170 are electrically connected to the key 110. By providing the speaker 322 and the radio device 170, the circulation fan can acquire a voice control instruction sent by a user via the radio device 170, and the motor 240 adjusts a rotation speed according to the voice control instruction; and the speaker 322 provides a voice message reflecting the current operating state to a user, so as to improve the convenience of using the circulation fan.

In another embodiment, the key 110 is further connected with an illuminating lamp 140, and the shield 220 is provided with a lampshade 223 cooperating with the illuminating lamp 140. By providing the illuminating lamp 140 and the lampshade 223, it is convenient for the circulation fan to emit illuminating light through the illuminating lamp 140 to improve the convenience of using the circulation fan.

In another embodiment, an upper end of the first bracket 310 is provided with a positioning block 312, the gear 311 with first teeth is fixed to the first bracket 310 by the positioning block 312; the upper end of the first bracket 310 is inserted into the shield 220 through the first teeth on the gear 311 to engage the second teeth 211. By providing the positioning block 312, the gear 311 can be quickly and stably fixed in the first bracket 310, the first teeth on the gear 311 can be stably engaged with the second teeth 211, and the positioning accuracy of the blowing assembly 200 can be improved. By engaging the first teeth on the gear 311 with the second teeth 211, an angle between the plane where the blades 210 are located and the first bracket 310 is manually adjustable in a vertical direction from −10 degrees to +90 degrees.

In another embodiment, the ends of the first bracket 310 and the second bracket 320 away from the shield 220 are respectively provided with a cover plate 330. By providing the cover plate 330, the stability of the connection between the first bracket 310 and the second bracket 320 and the shield 220 is ensured, so that the shield 220 is prevented from being loosened during operation, thereby improving the structural stability of the circulation fan and prolonging the service life of the circulation fan.

In another embodiment, the lower end of the base 100 is further provided with a hook 150 hinged to the base 100 and a snap-fit slot 160 cooperating with the hook 150. By providing the hook 150 and the snap-fit slot 160, the base 100 can be hung upside down via the hook 150, and the hook 150 can be completely received in the snap-fit slot 160, so as to improve the structural integrity and the convenience of use of the circulation fan.

In another embodiment, the upper end of the shield 220 is provided with a handle 224. By providing the handle 224, it is convenient to adjust the angle of the shield 220, and also convenient to transfer the circulation fan by the handle 224, so as to improve the convenience of using the circulation fan.

In another embodiment, the shield 220 is provided with a positioning groove 225, and the storage bin 230 is provided with a mounting block 231 cooperating with the positioning groove 225 and a through hole 232 for air permeation. By providing the positioning slot 225 and the mounting block 231, it is convenient to place mosquito coils, aromas and the like in the storage bin 230, so as to improve the compatibility and convenience of the circulation fan.

The working principle of the present disclosure is further described below.

In a production process, firstly, according to the requirements of the product, the blowing assembly 200 and the connecting assembly 300 with corresponding shapes and specifications are selected, so that the blades 210 are fixed in the shield 220 via the motor 240. In this embodiment, the shield 220 has a front-rear structure to facilitate mounting of the motor 240. Then, the components such as the key 110, the temperature sensor 120, and the display 130 are fixedly mounted in the base 100, and the speaker 322 is fixedly mounted in the second bracket 320. Then, a leading wire is led in the lead slot 221 on the shield 220, so that an outgoing line of the motor 240 passes through the lead slot 221 and the lead hole 321 to be electrically connected to the key 110, the temperature sensor 120, the display 130 and the like, and the baffle 222 is mounted on the lead slot 221. Next, an illuminating lamp 140 and a lampshade 223 are mounted on the shield 220; then one end of the lead slot 221 is inserted into the lead hole 321 to movably connect the shield 220 with the second bracket 320, the gear 311 with first teeth is fixed on the first bracket 310 via the positioning block 312, and the upper end of the first bracket 310 is inserted into the shield 220 via the first teeth on the gear 311 to engage with the second teeth 211. Then, the storage bin 230 is mounted to the front end of the shield 220 by fixing the mounting block 231 in the positioning groove 225. Finally, the hook 150 is mounted at the snap-fit slot 160 at a lower end of the base 100, and the cover plate 330 is mounted at each side of the shield 220 to complete the assembling process of the circulation fan. The whole assembly process is efficient and controllable, and the production efficiency of the circulation fan is improved.

During use, a battery can be mounted inside the circulation fan or an external power supply can be connected, and the user starts the circulation fan by pressing the key 110, the motor 240 drives the blades 210 to rotate, and the circulation fan starts to work. During operation, the motor 240 adjusts the rotational speed based on the readings from the temperature sensor 120 to change the rotational speed of the blades 210 to ensure user comfort. Moreover, the user can rotate the blowing assembly 200 by means of the handle 224 to rotate the gear 311, and since the first teeth on the gear 311 is engaged with the second teeth 211, the blades 210 can be precisely fixed, the angle between the blades 210 and the base 100 can be changed, and the air outlet angle of the blades 210 can be adjusted. Furthermore, the illuminating lamp 140 emits illumination light outwardly to satisfy a dark environment such as an outdoor environment and improve the convenience of using the circulation fan and the user experience. Moreover, the circulation fan can acquire a voice control instruction sent by the user via the radio device 170, and the motor 240 adjusts a rotation speed according to the voice control instruction; and the speaker 322 provides a voice message reflecting the current operating state to the user, so as to improve the convenience of using the circulation fan. The user can also remove the storage bin 230 and place aromas, mosquito coils, mosquito repellent oil and the like in the storage bin 230, and blow air against the storage bin 230 when the blades 210 rotate, and transfer the aromas, mosquito coils and the like to the outside of the shield 220 through the through hole 232. In addition, the circulation fan can be hung upside down by the hook 150 according to needs, thereby improving the compatibility of the circulation fan.

Furthermore, the radio device 170 receives a voice command instruction sent by the user and then sends it to the voice control system to control the switching of the motor 240, adjust the rotation speed, perform timing, switch the illuminating lamp 140, adjust the brightness of the illuminating lamp 140, display the battery electric quantity via the display 130, and the like. When there is a voice instruction to wake up the circulation fan, the circulation fan responds to the corresponding action, and the display 130 displays the corresponding operation. The display 130 is only displayed for a period of 5 seconds each time and is turned off if there is no new key press or command action, and turned on again if there is further command.

After the fan is turned off for 24 hours, if no voice command is received, the voice control system is turned off, and the wake-up of the voice control system needs to be started by pressing the key 110.

In addition, the circulation fan acquires the current temperature t via the temperature sensor 120, and performs speed control for different gears of the motor 240 according to the magnitude of the current temperature t. Specifically, when $t \leq 18°$ C., the fan is automatically turned off, and the motor 240 is in an off state; $18°$ C.$<t\leq 21°$ C., the fan automatically runs continuously at a first rotation speed; $21°$ C.$<t\leq 25°$ C., the fan automatically runs continuously at a second rotation speed; $25°$ C.$<t\leq 29°$ C., the fan automatically runs continuously at a third rotation speed; 29°

C.<t≤33° C., the fan automatically runs continuously at a fourth rotation speed; T>33° C., the fan runs continuously at a fifth speed automatically.

It can be seen from the above-mentioned description that according to the circulation fan of the present disclosure, by providing the blowing assembly 200 and the connecting assembly 300, the blowing assembly 200 can be flexibly provided on the base 100 to ensure structural stability of the circulation fan; by providing the first bracket 310 and the second bracket 320, it is convenient to adjust an angle of the blades 210 and also to facilitate a wire of a motor 240 leading to the base 100, so as to improve the convenience of using the circulation fan; by providing a gear 311 with first teeth and second teeth 211, an angle between the shield 220 and the stationary base 100 can be precisely adjusted to improve the ease of use and user experience of the circulation fan. By providing the key 110, the temperature sensor 120, and the display 130, it is ensured that the motor 240 can control the opening degree (i.e., the rotation speed) according to the temperature sensor 120 and the key 110, and visually displaying the working state of the circulation fan via the display 130, so as to improve the convenience of using the circulation fan. By providing the lead hole 321, the convenience of the leading wire between the motor 240 and the key 110 and the temperature sensor 120 is ensured, and the winding of the cable during the rotation of the blowing assembly 200 is avoided, thus affecting the structural stability of the circulation fan. By providing the positioning block 312, the gear 311 can be quickly and stably fixed in the first bracket 310, the first teeth on the gear 311 can be stably engaged with the second teeth 211, and the positioning accuracy of the blowing assembly 200 can be improved.

The embodiments of the present disclosure have been described above in detail with reference to the accompanying drawings, but the present disclosure is not limited to the above-mentioned embodiments, and various changes can be made within the scope of knowledge of a person skilled in the art without departing from the gist of the present disclosure.

What is claimed is:

1. A circulation fan, comprising a base, a blowing assembly and a connecting assembly, wherein the blowing assembly comprises blades, a shield, a storage bin and a motor for driving the blades to rotate, and the storage bin is detachably fixed on outer side of the shield; the connecting assembly comprises a first bracket and a second bracket, a gear with first teeth is mounted between the first bracket and the shield, and second teeth cooperating with the first teeth are provided on a side face of the shield; one end of the shield near the second bracket is provided with a lead slot, and a baffle is provided on outer side of the lead slot; and the shield is movably connected to the base by the first bracket and the second bracket, and wherein a key, a temperature sensor and a display are provided on the base, and the motor is electrically connected to the key, the temperature sensor and the display via the lead slot.

2. The circulation fan according to claim 1, wherein an upper end of the second bracket is provided with a lead hole cooperating with the lead slot, and the shield is movably connected to the second bracket by inserting one end of the lead slot into the lead hole.

3. The circulation fan according to claim 2, wherein a speaker is provided in the second bracket, a radio device is provided on the base, and the speaker and the radio device are both electrically connected to the key.

4. The circulation fan according to claim 1, wherein an illuminating lamp is connected to the key, and a lampshade is provided on the shield to cooperate with the illuminating lamp.

5. The circulation fan according to claim 1, wherein an upper end of the first bracket is provided with a positioning block, the gear is fixed to the first bracket by the positioning block; the upper end of the first bracket is inserted into the shield through the gear the with the first teeth being engaged to the second teeth.

6. The circulation fan according to claim 5, wherein an end of the first bracket away from the shield and an end of the second bracket away from the shield are provided with a cover plate respectively.

7. The circulation fan according to claim 1, wherein a lower end of the base is further provided with a hook and a snap-fit slot cooperating with the hook, and the hook is hinged to the base.

8. The circulation fan according to claim 1, wherein an upper end of the shield is provided with a handle.

9. The circulation fan according to claim 1, wherein the shield is provided with a positioning groove, and the storage bin is provided with a mounting block cooperating with the positioning groove and a through hole for air permeation.

* * * * *